(12) United States Patent
Kreiner et al.

(10) Patent No.: US 8,716,953 B2
(45) Date of Patent: May 6, 2014

(54) MECHANISMS FOR LIGHT MANAGEMENT

(75) Inventors: Barrett Kreiner, Woodstock, GA (US); Jonathan L. Reeves, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 554 days.

(21) Appl. No.: 12/632,574

(22) Filed: Dec. 7, 2009

(65) Prior Publication Data

US 2011/0133649 A1    Jun. 9, 2011

(51) Int. Cl.
*H05B 37/02* (2006.01)

(52) U.S. Cl.
USPC .......................... 315/307; 315/308; 315/297

(58) Field of Classification Search
USPC ........................ 315/86, 87; 362/195
See application file for complete search history.

(56) References Cited

U.S. PATENT DOCUMENTS

| | | | |
|---|---|---|---|
| 6,222,191 B1 | 4/2001 | Myron et al. | |
| 6,367,949 B1 | 4/2002 | Pederson | |
| 6,909,239 B2 | 6/2005 | Gauna | |
| 7,227,463 B2 | 6/2007 | Merrell | |
| 7,298,098 B2 * | 11/2007 | Wang | 315/307 |
| 7,463,146 B2 | 12/2008 | Reibel et al. | |
| 7,665,882 B1 * | 2/2010 | Wang | 362/650 |
| 7,731,383 B2 * | 6/2010 | Myer | 362/145 |
| 7,938,562 B2 * | 5/2011 | Ivey et al. | 362/276 |
| 2005/0281030 A1 | 12/2005 | Leong et al. | |
| 2006/0132323 A1 * | 6/2006 | Grady, Jr. | 340/815.45 |
| 2007/0035255 A1 * | 2/2007 | Shuster et al. | 315/200 R |
| 2007/0189001 A1 * | 8/2007 | Nielson et al. | 362/16 |
| 2007/0229250 A1 * | 10/2007 | Recker et al. | 340/531 |
| 2008/0304272 A1 * | 12/2008 | Joasil et al. | 362/458 |
| 2010/0135000 A1 * | 6/2010 | Smith et al. | 362/20 |
| 2010/0327757 A1 * | 12/2010 | Chung et al. | 315/158 |
| 2011/0133655 A1 * | 6/2011 | Recker et al. | 315/159 |

FOREIGN PATENT DOCUMENTS

WO    WO 2010064915 A1 *  6/2010

OTHER PUBLICATIONS zdnet.com, [online]; [retrieved on Sep. 28, 2011]; retrieved from the Internet http://www.zdnet.com/blog/service-oriented/wireless-data-may-eventually-be-delivered-by-led-light/7511?tag=nl.e540; McKendrick, "Wireless Data May Eventually be Delivered by LED Light" dated Aug. 25, 2011; 1 page.

* cited by examiner

*Primary Examiner* — Douglas W Owens
*Assistant Examiner* — Henry Luong
(74) *Attorney, Agent, or Firm* — Cantor Colburn LLP

(57) ABSTRACT

Mechanisms for light management include a light emitting diode (LED) light bulb. The LED light bulb includes multiple light emitting diodes (LEDs) configured for illumination in the LED light bulb and includes a battery. A base is configured to fit a standard socket designed for an incandescent light bulb, and the base is configured to operatively connect to an electrical power source. A module is operative to detect a residual voltage of the power source when a control for powering the LED light bulb is powered off. The module is configured to determine that a power outage occurred and operative to switch to battery power from the battery in response to not detecting the residual voltage of the power source.

18 Claims, 3 Drawing Sheets

MECHANISMS FOR LIGHT MANAGEMENT

BACKGROUND

Exemplary embodiments relate to, but are not limited to, light management utilizing light emitting diodes.

A light emitting diode (LED) may be a semiconductor diode as a two-terminal device. An LED maybe fabricated from a semiconductor material where one side of the semiconductor is attached to the P side which is the anode, and the other side of the semiconductor is attached to the N side which the cathode. Electricity can flow from the P side to the N side. However, no electricity can flow in reverse. LEDs are available in a variety of colors and popular colors include red, yellow, and green.

LED bulbs are now being considered as alternative lighting sources over incandescent and compact fluorescent light bulbs. For example, LED bulbs use very little power, last 10 years or more, and contain no hazardous substances. They are durable: they can be dropped and turned off and on repeatedly without damage. They can also operate in very cold or warm temperatures.

BRIEF SUMMARY

Exemplary embodiments include a light emitting diode (LED) light bulb. The LED light bulb includes multiple light emitting diodes (LEDs) configured for illumination in the LED light bulb and a battery. A base is configured to fit a standard socket designed for an incandescent light bulb, and the base is configured to operatively connect to an electrical power source. A module is operative to detect a residual voltage of the power source when a control for powering the LED light bulb is powered off. The module is operative to determine that a power outage occurred and operative to switch to battery power from the battery in response to not detecting the residual voltage of the power source.

Exemplary embodiments include a light emitting diode (LED) light bulb. The LED light bulb includes multiple light emitting diodes (LEDs) configured for illumination in the LED light bulb. A base is configured to fit one of the many standard sockets designed for an incandescent light bulbs, including but not limited to E10 (candelabra), E14 and E27 (standard domestic). A module is operative to detect motion via the multiple LEDs configured for illumination. The module is operative to determine a security emergency, and the module is operative to cause the LED light bulb and other LED light bulbs to illuminate in a mode indicative of the security emergency in response to the module detecting motion in a secure environment. The module is operative to cause the LED light bulb and other LED light bulbs to illuminate in a mode that dazzles where the motion is detected in response to the module detecting motion in the secure environment during the security emergency. The module is operative to cause the LED light bulb and the other LED light bulbs to illuminate with a low level of light in response to the module detecting a nighttime, and the module is operative to cause the LED light bulb and the other LED light bulbs to communicate together to track motion by illuminating with the low level of light when the module detects motion during the nighttime.

Exemplary embodiments include a system for light management. The system includes multiple light emitting diode (LED) light bulbs operative to communicate with one another, and the multiple LED light bulbs have bases configured to fit standard sockets designed for incandescent light bulbs. The multiple LED light bulbs are configured for illumination. A module of the multiple LED light bulbs is operative to control the multiple LED light bulbs, and the module is operative to detect an emergency. The module is operative to cause the multiple LED light bulbs to cooperatively illuminate a predefined exit route in response to detecting a fire emergency. The module is operative to cause the multiple LED light bulbs to cooperatively illuminate in a mode indicative of a weather emergency in response to detecting the weather emergency. The module is operative to cause the multiple LED light bulbs to cooperatively illuminate in a mode indicative of a security emergency in response to detecting the security emergency. In accordance with exemplary embodiments, cooperative illumination may include but not limited such examples as the following: a) To solidly light one or more LED bulbs completely in a specific color or series of colors in a defined pattern at a particular intensity; b) To intermittently light one or more complete LED bulbs in a specific color and/or series of colors in a defined pattern at a particular intensity. LED response speed permits an LED to simulate a strobe light by turning on or off at specific interval; c) To solidly and/or intermittently light parts of one or more LED bulbs in a specific color and/or series of colors in a defined pattern, or as needed; d) The cooperative illumination may be pre-programmed, and/or based on dynamic environmental conditions, including one or more people moving in the environment, be changed by the LED bulbs themselves and/or an external authority.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with features, by way of example with reference to the drawings.

DETAILED DESCRIPTION OF EXEMPLARY EMBODIMENTS

Light emitting diode (LED) lighting is an emerging technology as a replacement for incandescent and compact fluorescent lighting.

Figure 1:
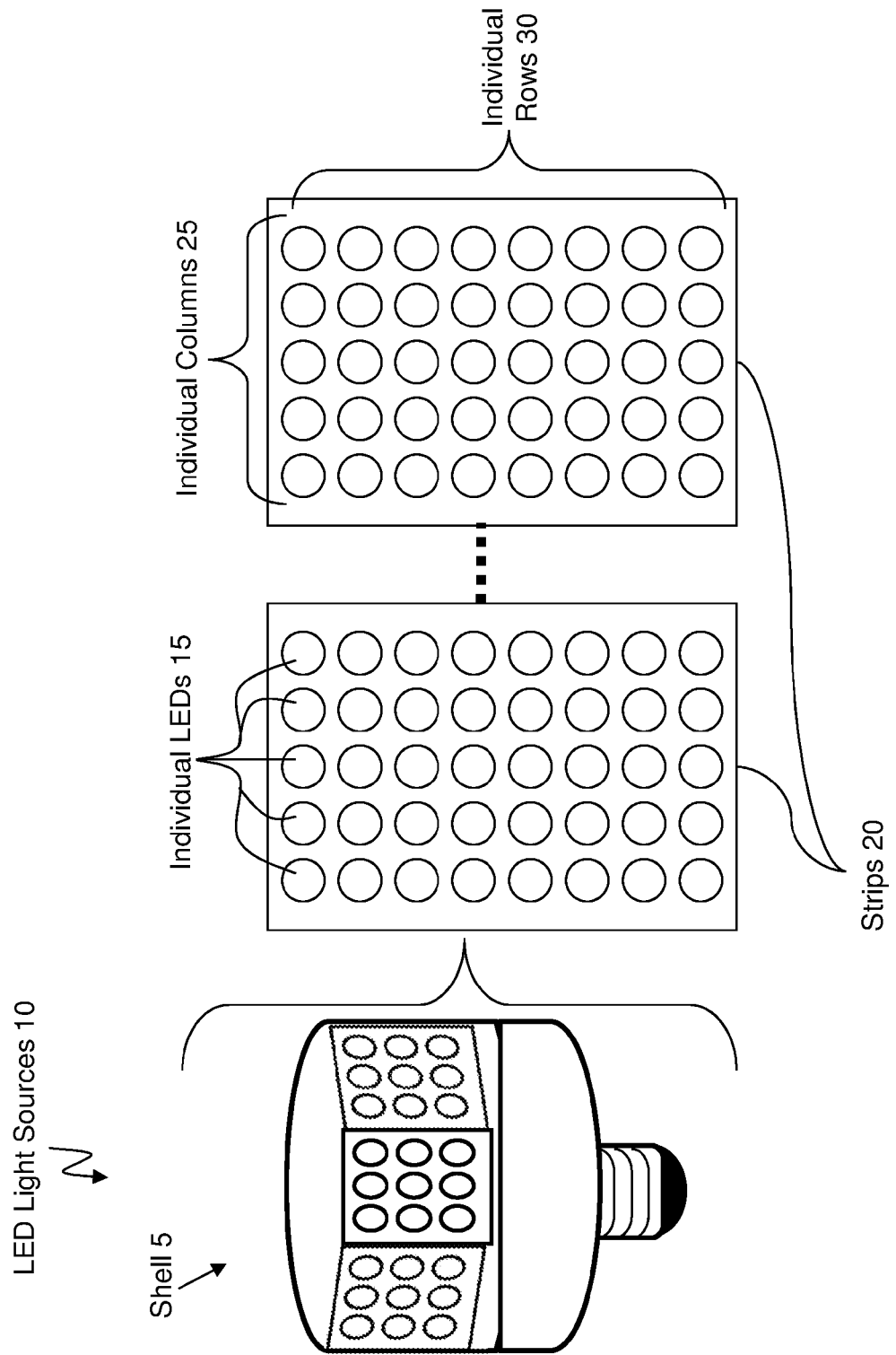
FIG. 1 illustrates a light emitting diode light source in accordance with exemplary embodiments.

In accordance with exemplary embodiments, FIG. 1 illustrates a representation of a light emitting diode (LED) source 10 which can be any type of LED lighting, such as an LED light bulb. The LED light source 10 may be an omni-directional light emitting diode (LED) light bulb composed of multiple LEDs arranged in an omni-directional pattern, which can simulate the functionality of incandescent bulbs. Also, the LED light source 10 may be an LED light bulb arranged in a directional pattern. The arrangement pattern of the multiple LEDs is not meant to be limiting.

The LED light source 10 may be configured to provide normal lighting in place of any incandescent light bulb in accordance with exemplary embodiments. The LED light source 10 is configured to fit the four common standard sizes of screw-in sockets used for lamps and light fixtures, which include candelabra: E12 in North America, E10 & E11 in Europe; intermediate: E17 in North America, E14 in Europe; medium or standard: E26 in North America, E27 in Europe; and large: E39 in North America, E40 in Europe. In each designation, the E stands for Edison, who created the screw-base lamp, and the number is the diameter of the screw base in millimeters. The LED light source 10 can be screwed into a standard E26 socket or any other type of socket used by incandescent light bulbs. The base of the LED light source 10 light bulbs may be configured to fit various standard size sockets for screw-in light bulbs and is not limited to specific sizes discussed herein.

The LED light source 10 may have a translucent shell 5, e.g., the shell 5 may be formed of clear glass. Strips 20 are positioned within the shell 5 to provide light. The strips 20 represent numerous strips 20, such as strips 1 through N, that can be located within the LED light source 10, where N represents the last number of strips 20. The strips 20 may be positioned for omni-directional lighting and/or for directional lighting. The strips 20 may each include an array of individual LEDs 15 that can simulate a wide range of colors. The individual LEDs 15 are arranged in individual columns 25 and rows 30 on the strips 20. The strip 20 is configured to provide electrical voltage to pump each individual LED 15. Each individual LED 15 may be individually addressable on the strip 20, and each strip 20 is individually addressable. For example, in the LED light source 10, each single LED 15 may be addressed by its column 25, row 30, and/or particular strip 20. As such, the LED light source 10 can light up as few or as many individual LEDs 15 on the strips 20 as desired.

The LEDs 15 may be or include tricolor light emitting diodes where a singe LED 15 can emit red, blue, and green light. The tricolor LEDs 15 of the LED light sources 10 can be utilized to simulate a wide range of colors. The LEDs 15 can be dimmed by intermittently raising and lowering the power, which can lead to a persistence of vision effect of a bulb, e.g., "blinking" as the human eye passes across it. The LEDs 15 can switch fast enough to simulate traditional strobe lighting, currently used in public service applications by the fire department, police department, or emergency services.

In exemplary embodiments, the LED light sources 10 (bulb) may be operated as a fractional light source in which only some of the LEDs 15 of the LED light source 10 are driven while others are not. Also, some LEDs could be dimmed while others are not.

Figure 2:
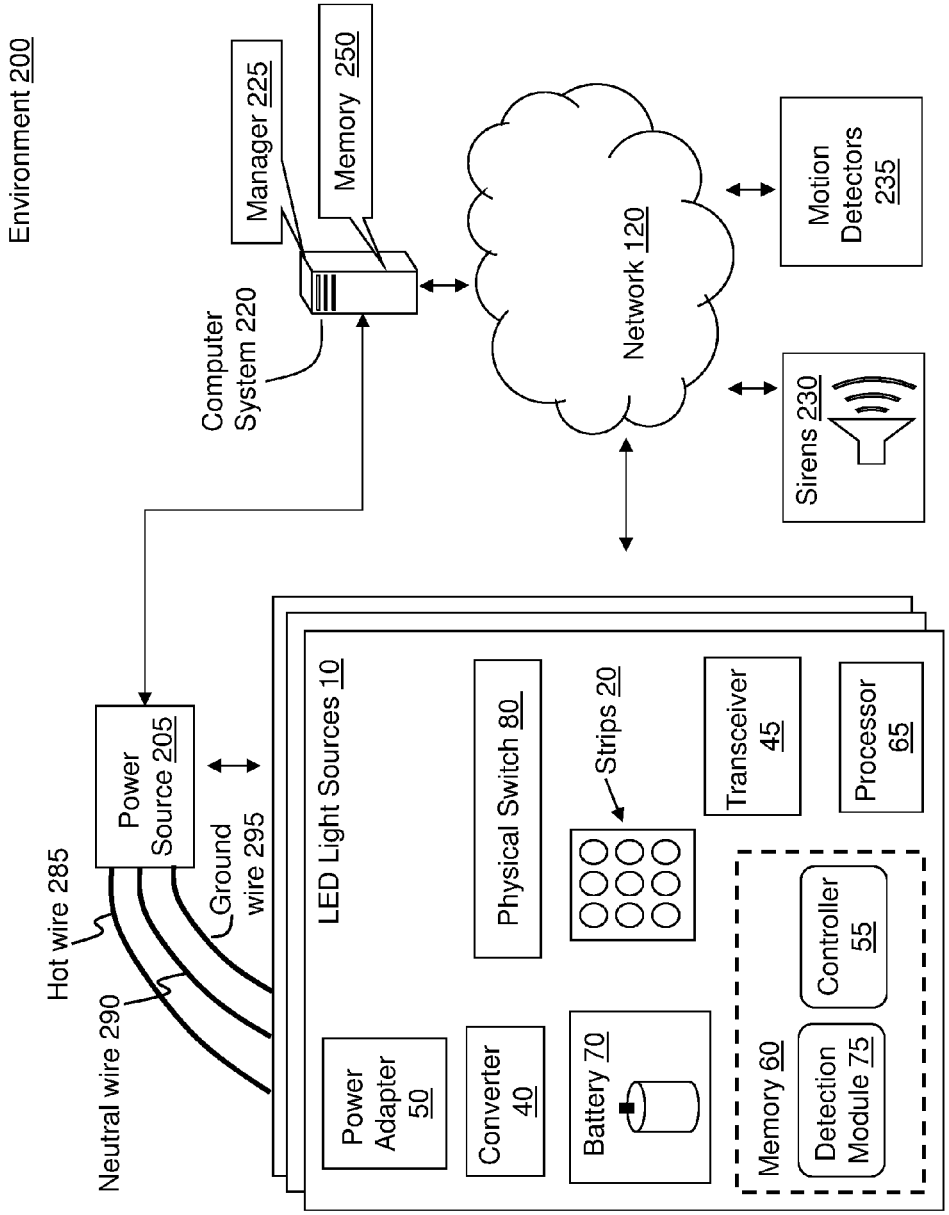
FIG. 2 illustrates an environment in accordance with exemplary embodiments.

FIG. 2 illustrates an environment 200 in accordance with exemplary embodiments. In FIG. 2, the LED light sources 10 are representative of countless LED light sources 10 having identical features.

The LED light sources 10 may be operatively connected to a power source 205. If the power source 205 is an alternating current (AC) power source, a converter 40 is configured to convert the AC power to direct current (DC) power. The power source 205 includes the residential and/or commercial electrical wiring necessary to provide commercial and other power to the LED light source 10. If the power source 205 is a DC power source, the converter 40 is configured to convert the DC power from the power source 205 to the appropriate voltage level to operate the LED light source 10. For example, the LED light source 10 may be placed in either an AC powered receptacle or a DC powered receptacle of the power source 205, and the LED light source 10 can function and charge properly due to the internal DC and AC/DC switching power supplies of the converter 40.

The LED light sources 10 may be screwed into various lamps and light fixtures in ceilings and walls to replace incandescent light bulbs. For example, the LED light sources 10 may be screwed into standard E26 light bulb sockets and other type of light bulb sockets. As such, there are numerous LED light sources 10 located throughout the environment 200 in accordance with exemplary embodiments. The environment 200 may be an office, office building, home, and/or rooms of a home. The LED light sources 10 may be operatively connected to communicate with one another via a network 120. The LED light sources 10 may each include a transceiver 45 for communicating over the network 120. Also, a computer system 220 may be operatively connected to the network 120, and the computer system 220 can communicate with the LED light sources 10.

Each LED light source 10 can communicate with one another and with the computer system 220 by utilizing known protocols and standards. For example, the Session Initiation Protocol (SIP) may be utilized to allow communication in the environment 200. SIP may utilize various commands, such as SIP Notify, SIP Invite, SIP Acknowledge, and others known in the art to communicate in the environment 200. For example, the standards of the Digital Living Network Alliance (DLNA) may be utilized to allow devices within the environment 200 to share their content with each other across a home or office network without a complicated configuration process. DLNA is a concept of wired and wireless interoperable networks. Also, Simple Network Management Protocol (SNMP) may be used to allow various devices to communicate in the environment 200, or any other suitable protocols and standards may be used as understood by one skilled in the art.

Additionally, the LED light sources 10 may communicate with one another and the computer system 220 via a power adapter 50 over the electrical wiring of the power source 205, such as the residential/commercial electrical wiring in a home, office, and any type of building, by utilizing technologies understood by one skilled in the art. The communications may be transmitted and received at the power adapter 50 of the LED light sources 10 and computer system 220 via the wiring of the power source 205. The computer system 220 and LED light sources 10 may include, e.g., an X10 power adapter, which can be implemented as the power adapter 50, for communicating over the electrical wiring. For example, in accordance with exemplary embodiments, various technologies such X10, KNX, INSTEON, BACnet, and LonWorks may be used as protocols and standards for communication among electronic devices used for home automation, also known as domotics. X10, e.g., may utilize electrical wiring for signaling and control, where the signals involve brief radio frequency bursts representing digital information. This digital data is encoded onto a 120 kHz carrier which is transmitted as bursts during the relatively quiet zero crossings of the 50 or 60 Hz AC alternating current waveform. The digital data may include addresses and commands sent from peer devices and/or from a controller to controlled devices. In exemplary embodiments, whether communicating via the transceiver 45 and/or the electrical wiring of the power source 205 via the power adapters 50, each of the LED light sources 10 is individually addressable, and this may be a unique identification such as an IP address and MAC address.

The LED light source 10 may include a controller 55 stored in memory 60 and/or implemented as application specific integrated circuits to operate in accordance with exemplary embodiments discussed herein. The controller 55 of the LED light sources 10 is configured to receive, transmit, control, and process communications via the transceiver 45 and/or power source 205. The controller 55 allows the LED light sources 10 to peer to one another so that the LED light sources 10 can communicate data. The LED light sources 10 are distinguished from one another by their unique address, such as an IP address and/or MAC address. The controller 55 and/or the computer system 220 can instruct LED light sources 10 to individually and cooperatively carry out various actions as discussed herein. Any action performed by a single LED light source 10 can be communicated to others and performed in a concerted effort by multiple LED light sources 10.

The controller 55 is configured to operate the individual LEDs 15 on the strips 20. Since the individual LEDs 15 are addressable, the controller 55 can cause a single LED 15 to illuminate, a column 25 of LEDs 15 to illuminate, multiple columns 25 of LEDs 15 to illuminate, a row 30 of LEDs 15 to illuminate, multiple rows 30 of LEDs 15 to illuminate, and any combination thereof. Also, the controller 55 can cause one or more LEDs 15 to illuminate on different strips 20 of the LED light source 10. A processor and/or processing circuit 65 can process computer executable instructions of the controller 55 to cause any of the individual LEDs 15 to light up, and the addresses, such as the row 30 and column 25 addresses for each LED 15 is stored in the memory 60. Also, the type of LED, such as tricolor LEDs 15, infrared LEDs 15, and white light producing LEDs 15 along with the location of each LED 15 on the strips 20 is stored on the memory 60. Since the LEDs 15 are each distinctly addressable in the LED light sources 10, the controller 55 knows the exact location of each type of LED 15 on any of the strips 20 and can cause any specific type of LED to illuminate.

In accordance with exemplary embodiments, the computer system 220 may be a home or office security system, may be tied into a security system, may manage a security system, and/or may manage a home or office network. The computer system 220 may be a management system, which manages fire emergencies, security emergencies, weather emergencies, power outages, etc. Also, the computer system 220 may be a computer that is operable by users in the environment 200. The LED light sources 10 are configured to operate in conjunction with the computer system 220. The computer system 220 may include a manager 225 for operating and controlling various devices, such as the LED light sources 10, sirens/intercom 230, and/or motion detectors 235 operatively connected to the computer system 220. For example, to alert a user that there is a fire or security emergency, the manager 225 of the computer system 220 may communicate to the LED light sources 10 that there is a fire/security emergency in the environment 200 via the transceiver 45 and the power source 205. Also, the LED light sources 10 may detect the emergency and communicate this information to other LED light sources 10. Although the LED light sources 10 can be utilized for any emergency or situation, a fire emergency is discussed below for explanation purposes. In response to the controller 55 receiving an alert from the computer system 220 of an emergency, the controller 55 may cause the LED light sources 10 in the environment 200 to go into a strobe mode, to go into a slow pulse mode, and/or to rapidly or slowly change colors to alert the homeowners of the fire emergency. So, if there are 30 LED light sources 10 in light fixtures and lamps throughout a home or office, each and/or some LED light sources 10 may go into strobe mode, slow pulse mode, and/or change colors to alert the users of the fire emergency. As mentioned herein, the LED light sources 10 may be screwed into normal light fixtures and lamps replacing incandescent light bulbs, which allows the LED light sources 10 to automatically enhance a users awareness of the fire emergency and/or any type of emergency without having to buy specialized security/emergency equipment to install in places where a normal incandescent light bulb would have been. Since incandescent light bulbs are used in, e.g., bathrooms, offices, bedrooms, garages, tool sheds, kitchens, etc., the LED light sources 10 provide automatic awareness of emergencies in such areas.

Also, the computer system 220 may be a set top box, may include the features of a set top box, may be connected to a set top box, and/or may be a communication device configured to receive and relay emergency information. In the event of a weather emergency, the manager 225 of the computer system 220 transmits a weather alert to the LED light sources 10. The respective controller 55 for each of the LED light sources 10 throughout, e.g., the home receives the weather alert from the computer system 220 via the transceiver 45 and/or power source 205. In response to receiving the weather alert from the computer system 220, the controller 55 causes the LED light sources 10 to alert those in the vicinity by entering strobe mode, pulse mode, and/or change color mode. Also, during any type of emergency, the individual LEDs 15 may shine at a brighter intensity than normal to alert the user. For example, during a tornado and/or hurricane warning, the LEDs 15 may flash orange by combining multiple colors of the LEDs 15 to have an orange appearance. As the emergency, such as the tornado and/or hurricane becomes more imminent, the LEDs 15 may flash red and orange at a greater rate with the highest intensity to warn the users in the home that the particular emergency is about to occur.

In exemplary embodiments, the LEDs 15 are also configured to operate as emitters and sensors. For example, the LEDs 15 of the LED light source 10 are configured to operate as solar cells. As solar cells, the LEDs 15 can charge a rechargeable battery 70 of the LED light sources 10. Also, the battery 70 can be charged by the power received from the power source 205. In the event of a power outage, the LED light source 10 can be powered by the battery 70. During a power outage and/or emergency, the LED light sources 10 can be unscrewed and utilized as self-contained light sources in accordance with exemplary embodiments.

Additionally, a detection module 75 of the LED light sources 10 can detect light incident on the LEDs 15 by reading the charge of the LEDs 15. The detection module 75 is configured to detect which ones of the LEDs 15 are being charged by light, e.g., by reading the ambient light in a room. The detection module 75 can detect the change in light incident on the LEDs 15 as compared to neighboring LEDs 15, and can detect motion in the field of view of the LEDs 15. Also, in exemplary embodiments, some of the LEDs 15 of the LED light source 10 may include infrared light emitting diodes 15. The detection module 75 is configured to utilize infrared LEDs 15 to detect energy in the infrared portion of the electromagnetic spectrum by detecting heat energy and/or the change in heat energy incident on the infrared LEDs 15.

The controller 55 can cause the LEDs 15 and the infrared LEDs 15 to act as sensors to detect and track movement via the detection module 75 as objects move across the field of view of multiple LED light sources 10. In accordance with exemplary embodiments, the detection module 75 can read individual LEDs 15 of various LED light sources 10 to obtain a luminosity level from the direction the LEDs 15 are facing. The change in luminosity levels can be used to track movements within the field of view of LEDs 15 in a given LED light source 10 bulb. As discussed herein, there can be numerous LED light sources 10 located throughout a home, e.g., in light fixtures and lamps. Each LED light source 10 includes the detection module 75 that is configured to detect and track movements.

The user of the computer system 220 can instruct the LED light sources 10 that no movement should be detected in the environment 200 via the transceiver 45 and power source 205. Since the distinct address of each LED light source 10 is known and stored in the memory 250 of the computer system 220, the user utilizing the computer system 220 may instruct particular LED light sources 10 that no movement should be detected. LED light sources 10 near windows, doors, and/or in rooms not commonly used may be instructed that no movement should be detected in those secured areas. For example, the user may provide a setting that no movement should be detected by any LED light sources 10 in the secured area of a basement of the home. The user may utilize the computer system 220 to set the setting. If movement is detected in the basement, the controller 55 is configured to cause the LED light sources 10 to dazzle an intruder with bright strobing light that disorients the intruder. As the intruder attempts to maneuver in the basement, other LED light sources 10 can detect the intruder's movement, and the particular light sources 10 that originally detected the intruder can pass along tracking information to other light sources 10. As such, wherever the intruder moves, the intruder will continuously be dazzled with bright strobing light that follows the intruder. Also, the controller 55 can communicate the security emergency to the computer system 220 and other LED light sources 10, and the computer system 220 can cause the siren/intercom 230 to alert that an intruder is present, and the computer system 220 can call the police. So even though no conventional motion detectors 235 may be installed, e.g., in the basement and/or any other place, the detection module 75 can detect and track the intruder via thermal energy and light energy and communicate to the computer system 220 that the intruder is present in the basement. Since the location of each LED light source 10 is known and can be corresponded to each room in the home, the computer system 220 can state to the homeowners upstairs that "the intruder is detected in the basement" via the intercom 203. Based on the individual locations of the LED light sources 10 in the environment 200, the computer system 220 can audibly state over the intercom 230 that the intruder is located in that corresponding location in the environment 200 without the need of the conventional motion detectors 235. In addition to the LED light sources 10 in the vicinity of the intruder illuminating with bright strobing light to dazzle the intruder, other LED light sources 10 may go into an alarm mode indicative of the security emergency. For example, the other LED light sources 10 may illuminate with, e.g., flashing red and blue light to indicate that there is a security emergency instructed by LED light sources 10 and/or the computer system 220.

As discussed herein, the detection module 75 is configured to determine luminosity levels by reading the ambient light in the area around the LED light sources 10. Based on receiving light levels from the LEDs 15 of the ambient light detected by the detection module 75, based on a communication from the computer system 220, and/or based on an internal clock of the controller 55, the controller 55 is configured to determine that, e.g., it is evening and/or nighttime. Accordingly, the controller 55 can cause the LED light sources 10 to reduce their level of light. The respective controllers 55 of various LED light sources 10 may automatically turn some LEDs 15 off on each strip 20 of the LED light sources 10, so that the overall level of light in a room is more comfortable for an evening setting. In addition to decreasing the overall level of light, as night progresses, the controller 55 may add more of a blue or red tint to the light by utilizing the tricolors of the tricolor LEDs 15.

Further in exemplary embodiments, the LED light sources 10 may be configured to act as nightlights. For example, the detection module 75 may detect movement, e.g., of a child stirring during the night via the LEDs 15 and the thermal LEDs 15. In response to detecting movement, the controller 55 causes a certain number of the LEDs 15 to light but not all the LEDs 15, so that the child has a very low level of light in his room as comfort. In response to the controller 55 no longer receiving a detection of movement from the detection module 75, the controller 55 can reduce the level of light for the LEDs 15 of the LED light source 10 down to a minimum level of light, can progressively reduce the level of light of the LEDs 15 as the night continues, and/or can turn the LED light source 10 off completely.

Also, when the controller 55 determines that it is evening time and/or nighttime, a person may need to go to the refrigerator, downstairs, bathroom, and/or just move throughout the house. When the controller 55 detects movement during the night, the controller 55 may be configured to provide a low level of light based on the movement by only illuminating a few LEDs 15 on the strips 20. Since the controllers 55 of the LED light sources 10 are configured to detect movement and track movement, the controller 55 of the LED light sources 10 cause some of the LEDs 15 to illuminate to provide a follow me type of lighting for a person maneuvering throughout the home during the night without the person having to flip a switch to turn on a bright light. For example, as the person walks to the refrigerator, downstairs, bathroom, and/or just moves throughout the house, certain but not all of the LEDs 15 of the LED light sources 10 may turn on. As the person walks into the field of view of the LEDs 15 on the strips 15, a few LEDs 15 can light up, and the controller 15 can detect and track the direction that the person is moving. One LED light source 10 may communicate with other LED light sources 10 in the direction that the person is walking to inform the upcoming LED light sources 10 to turn on a few LEDs 15 to provide a low level of light in the direction that the person is walking. This process of providing a low level of light by the various LED light sources 10 continues until no more movement of the person is detected by the detection module 75, such as, e.g., the person has lain back down to rest, and/or until the person turns on a switch to illuminate the room normally.

Also, if the controller 55 determines that it is nighttime based on detecting the ambient light, based on an internal clock of the controller 55, and/or based on communications from the computer system 220 indicating that it is nighttime, the controller 55 is configured to turn on certain LED light sources 10 to imitate that someone is in the home. The computer system 220 may indicate to the to the LED light source 10 that it is nighttime and that certain LED light sources 10 should be turned on to imitate that someone is in the home.

In the event of a power outage, the controller 55 is configured to implement a conservation mode by, e.g., illuminating a few LEDs 15 based on the stored battery power of the battery 70 and/or based on the ambient light detected by the detection module 75. For example, if the detection module 75 detects that the ambient light is bright and/or at a certain luminosity level, the controller 55 may only turn on a few LEDs 15 on the strips 20 and/or may not turn on any LEDs 15 until the ambient light decreases. By limiting the number of LEDs 15 that are lit during a power outage, the controller 55 reduces power consumption of the battery 70. If the controller 55 determines that the battery power 70 is low and/or getting low, the controller 55 may reduce the number of LEDs 15 that are illuminated to conserve battery power of the battery 70.

Also, the detection module 75 is configured to distinguish between a power outage and a switch being turned off, by monitoring residual voltage on the wiring of the power source 205. The residual voltage can be used to charge the battery 70 although the light switch has been turned off for the LED light source 10. The converter 40 may incorporate the hardware/software of a multimeter, e.g., to measure voltage, current, and resistance. For detecting the amount of voltage and current on the electrical wiring of the power source 205, the detection module 75 may incorporate the multimeter functions of the converter 40 and/or may operate in conjunction with the converter 40. In residential and commercial wiring, a residual voltage, e.g., 7 volts is usually on the line. So even if a light switch opens the connection of the hot wire 285, the neutral wire 290 and ground wire 295 remain closed allowing a path with the LED light sources 10 to remain. Accordingly, the controller 55 is configured to utilize the residual voltage of the power source 205 to charge the battery 70 even as the light switch is turned off. Further, the detection module 75 can determine when the residual voltage is present and when the residual voltage is not present, and the controller 55 determines that there is a power outage when the residual voltage is not present when the light switch is turned off. As such, the controller 55 may execute the conservation mode to conserve battery power of the battery 70, by illuminating fewer LEDs 15 than normal based on the level of ambient light. The more ambient light detected by the detection module 75, the fewer LEDs 15 that may be illuminated. Based on the ambient light and the remaining battery power of the battery 70, no LEDs 15 may be illuminated until needed, until the ambient light reduces considerably, and/or until movement is detected by the detection module 75. Since the LED light source 10 has its own battery 70, the LED light source 10 can be removed from the light socket and utilized to provide light as a self-contained unit. The LED light source 10 may also include a physical switch 80 that can be turned on and off by the user when the LED light source 10 is removed from the light socket. For example, the physical switch 80 may be an electromechanical switch located on or near the base of the LED light source 10. There may be various ways to implement the physical switch 80 for turning on and off the LED light source 10. For example, the physical switch 80 of the LED light source 10 maybe implemented as an actuator and may be a toggle, a dolly, a rocker, a push-button, a slide switch, and/or any type of mechanical switch. Also, by the user holding the LED light source 10, the user may act as a continuity point and cause the LED light source 10 to power on.

When the LED light source 10 is removed from the light socket and is operated as a portable light source, the LED light source 10 may continue to conserve battery power of the battery 70 as discussed herein, e.g., based on the ambient light, detected movement, and remaining battery power. Also, the different LED light sources 10 can communicate with one another, e.g., by peering to one another, to indicate the amount of their respective remaining battery power of the battery 70. The LED light sources 10 can communicate over the electrical wiring of the power source 205 when screwed in and/or with the transceivers 45 to cause some LED light sources 10 to illuminate in a room or home while others remain off during the power outage. The LED light sources 10 can continue communicating with one another to conserve the battery power of their respective batteries 70, e.g., by alternating their time for illumination, so that multiple LED light sources 10 are not providing light in a duplicative manner.

Additionally, during a power outage, the LED light sources 10 are still capable of detecting motion. For example, the detection module 75 can detect that a person has walked into a room, and the controller 55 can turn on the appropriate number of LEDs 15 based on battery power of the battery 70 and/or based on the ambient light in the room. The brighter the ambient light in the room, the fewer LEDs 15 are illuminated by the controller 55. Also, the lower the remaining battery power of the battery 70, the fewer LEDs 15 are illuminated by the controller 55. The controller 55 may alternate which LED light sources 10 are to light up based on the remaining battery power of the batteries 70 of respective LED light sources 10. When motion is no longer detected in the room, the controller 55 is configured to turn off the LED light sources 10 completely and/or to allow only a few LEDs 15 to illuminate on a single LED light source 10.

The detection module 75 of the LED light sources 10 is configured to detect when the infrared LEDs 15 detect temperatures and/or thermal energy over a certain threshold, such as greater than and/or equal to 300, 400, 500, 600, or 700 degrees Fahrenheit (F). As such, the LED light sources 10 can be utilized to detect fire emergencies and go into a flash mode to indicate that there is a fire, e.g., flashing red and blue light. Often during a fire emergency, fire emergency personnel may cut power to a building or residence as a precaution. In such cases, the LED light sources 10 can no longer receive power from the power source 205. When the power is out at the building, the LED light sources 10 are still configured to operate. For example, if a person is unable to escape from a room during a fire emergency, the controller 55 detects that the person is in the room and causes the LED light sources 10 in the room to go into strobe mode and/or to change colors, so that fire personnel can locate that person in the room. If fire personnel enter a dark, smoky building, the fire personnel can recognize the strobe mode of the LED light source 10 indicating that a person is in the vicinity, and the controller 55 may cause the other LED light sources 10 in the building to refrain from strobe mode, so that the fire personnel can readily identify the LED light source 10 in strobe mode. If there are other people in need of assistance in different rooms, the controller 55 causes other LED light sources 10 in the respective locations to illuminate in strobe mode to indicate that a person is in the respective rooms. Additionally, the controller 55 may cause the LED light sources 10 to cooperatively paint the person with light by causing the LEDs 15 to direct their light on the, e.g., injured person in the room even during a power outage. For example, the detection module 75 detects and tracks the person in the room based on movement and/or thermal energy. The controller 55 causes LEDs 15 pointed toward the person to illuminate and causes the LEDs 15 pointed in other directions to power off or down. The controller 55 can communicate with multiple LED light sources 10 to cause them to also illuminate LEDs 15 in the field of view of the person and power off LEDs 15 pointed in other directions, so that their light will cooperatively illuminate the person. If fire personnel or anyone else enters the building looking for the person, the fire personnel can readily see the person in which the LED light sources 10 have illuminated with a spotlight. Moreover, in response to the controller 55 module determining that there is a fire emergency, the controller 55 is operative to cause the LEDs 15 to actively search for motion by selectively powering off certain LEDs 15 of the LED light sources 10, so that the powered off LEDs 15 can detect motion and illuminate the moving person.

Also, during a fire emergency, the controller 55 is configured to peer with other controllers 55 of the LED light sources 10 to cooperatively light a pathway to emergency exits as well as illuminate an injured person. Even during power outages of any kind, the LED light sources 10 can still communicate with each other via the wiring of the power source 205 and the respective transceivers 45. For example, the LED light sources 10 may cooperatively light a predefined exit route utilizing red flashing lights to illuminate the pathway to the emergency exit during the fire emergency so that any person in the area can follow the red flashing LEDs 15. For example, the controller 55 may cause the exit route to light up to show the pathway with red blinking lights of the LEDs 15 as the person moves from place to place in search of an exit. Each LED light source 10 that lights the pathway to the emergency exits can adjust the intensity of their LEDs 15 based on remaining battery power of their respective batteries 70. Other LED light sources 10 that do not light a pathway to the exit would provide normal or minimal lighting so as not to interfere with the red flashing light of the LEDs 15 indicating the pathway to the exit.

For any of the examples discussed herein, the controller 55 can control the brightness, intensity, color, shade, blinking, and/or pattern of LEDs 15 of the LED light source 10. For example, during an emergency, the controller 55 may increase or decrease the brightness, increase or decrease the intensity, change the color of the LEDs 15 of the LED light source 10, and/or change a blinking pattern of the LEDs 15 of the LED light source 10, or any combination thereof. Blinking or flashing patterns of the LED light sources 10 to alert users of various emergencies may include very slow, slow, medium, fast, and very fast. Also, the blinking pattern may include various combinations, such as slow blinks then fast blinks, fast blinks then slow blinks, etc.

Although the controller 55 and the detection module 75 are separately shown in FIG. 2, the controller 55 and detection module 75 may be implemented as a single integrated module and/or as multiple modules. Any module may represent a cluster of modules. Also, other elements may be integrated together and referred to as a module.

It is understood by one skilled in the art that each element described in the present disclosure contains all the necessary hardware, software, and/or firmware to operate and function as discussed herein in accordance with exemplary embodiments.

Figure 3:
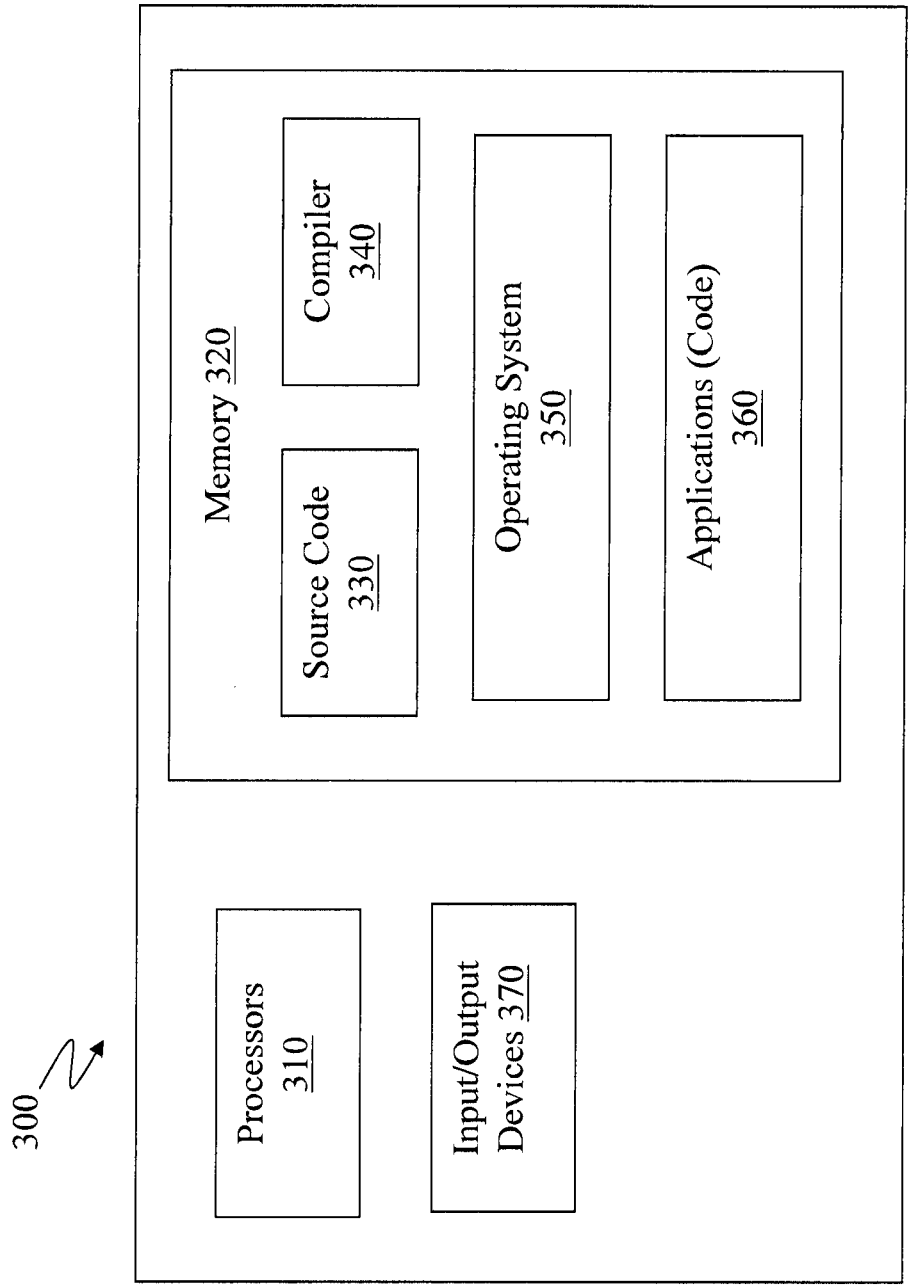
FIG. 3 illustrates a computer having elements utilized in exemplary embodiments.

FIG. 3 illustrates an example of a computer 300 that may be utilized in implementing exemplary embodiments. For example, the computer 300 may have one or more elements that may be utilized in implementing the LED light sources 10, the computer system 220 and modules in accordance with exemplary embodiments. The computer 300 includes, but is not limited to, PCs, workstations, systems, laptops, PDAs, palm devices, servers, mobile devices, communication devices, cell phones, computer systems, set top boxes (STB), televisions (TV), game consoles, MP3 players, and the like. The computer 300 may include a processor 310, memory 320, and one or more input and/or output (I/O) 370 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in computer readable memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The computer readable memory 320 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. In the example illustrated in FIG. 3, the software in the memory 320 includes a suitable operating system (O/S) 350, compiler 340, source code 330, and one or more applications 360 (or modules) of the exemplary embodiments.

The operating system 350 controls the execution of other computer programs, and provides scheduling, input-output control, file and data management, memory management, and communication control and related services. It is contemplated by the inventors that the application 360 for implementing exemplary embodiments is applicable on all other commercially available operating systems.

The application 360 may be a source program, executable program (object code), script, or any other entity comprising a set of instructions to be performed. When a source program is to be executed, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, remote controller, camera, biometric input device(s), a vibrator device for non-audible alert, etc. Furthermore, the I/O devices 370 may also include output devices, for example but not limited to, a printer, display, speaker, etc. Also, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 include may include modems, gateways, receivers, transmitters, transceivers, etc. for communicating over a communications network.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software, it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable medium can be stored, communicated, propagated, or transported for use by or in connection with the instruction execution system, apparatus, or device.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus for a light emitting diode light bulb, comprising:
    a plurality of light emitting diodes operative for illumination in the light emitting diode light bulb;
    a battery;
    a base that fits a socket designed for an incandescent light bulb, the base operatively connecting to an electrical power source; and
    a module operative to detect a residual voltage of the electrical power source when a control for powering the light emitting diode light bulb is powered off, the module detecting the residual voltage when a path to a hot wire is open in the electrical power source, wherein the module comprises and integrates hardware of a detection module and controller;
    wherein the module is operative to determine that a power outage occurred and operative to switch to battery power from the battery in response to detecting no presence of the residual voltage of the electrical power source;
    wherein when the path to the hot wire is open in the electrical power source, the module detects the residual voltage on a closed path with the light emitting diode light bulb that remains closed between a neutral wire and a ground wire, the residual voltage being approximately 7 volts.

2. The apparatus of claim 1, wherein the module is operative to prevent certain light emitting diodes of the plurality of light emitting diodes from illuminating during the power outage.

3. The apparatus of claim 2, wherein the module is operative to detect that the power outage has concluded based on detecting the presence of the residual voltage; and
    in response to detecting that the power outage has concluded, the module is operative to allow all of the light emitting diodes of the plurality of light emitting diodes to illuminate.

4. The apparatus of claim 1, wherein in response to the module determining that there is a fire emergency, the module is operative to communicate with other light emitting diode light bulbs having light emitting diodes; and
    wherein the module causes the light emitting diode light bulb and the other light emitting diode light bulbs to illuminate as a predefined exit during the fire emergency.

5. The apparatus of claim 1, wherein in response to the module determining that there is a fire emergency, the module is operative to actively search for motion by selectively powering off certain light emitting diodes of the plurality of light emitting diodes; and in response the module detecting motion, the module is operative to illuminate light emitting diodes of the plurality of light emitting diodes that are directed toward the motion such that a person moving in an area is constantly tracked by light illuminating from the plurality of light emitting diodes.

6. The apparatus of claim 1, wherein the module is operative to detect a security emergency;

wherein in response to detecting the security emergency, the module is operative to communicate with other light emitting diode light bulbs having light emitting diodes; and wherein the module is operative to cause the light emitting diode light bulb and the other light emitting diode light bulbs to cooperatively illuminate in a mode indicative of the security emergency.

7. The apparatus of claim 1, wherein the module is operative to detect a weather emergency;

wherein in response to detecting the weather emergency, the module is operative to communicate with other light emitting diode light bulbs having light emitting diodes; and wherein the module is operative to cause the light emitting diode light bulb and the other light emitting diode light bulbs to cooperatively illuminate in a mode indicative of the weather emergency.

8. The apparatus of claim 1, wherein in response to a fire emergency, a security emergency, and a weather emergency, the module is operative to cause the light emitting diode light bulb and other light emitting diode light bulbs to increase and decrease brightness, increase and decrease intensity, change a color, and change a blinking pattern.

9. The apparatus of claim 1, further comprising a power on and off mechanism integrated into the base of the light emitting diode light bulb.

10. The apparatus of claim 9, wherein in response to the light emitting diode light bulb being unscrewed from the base that fits the socket designed for the incandescent light bulb, the power on and off mechanism causes the light emitting diode light bulb to be powered by battery power from the battery.

11. An apparatus for a light emitting diode light bulb, comprising:

a plurality of light emitting diodes operative for illumination in the light emitting diode light bulb;

a base which fits a socket designed for an incandescent light bulb;

a module operative to detect motion via the plurality of light emitting diodes for illumination, wherein the module comprises and integrates hardware of a detection module and controller;

wherein the module is operative to cause the light emitting diode light bulb and other light emitting diode light bulbs to illuminate with a low level of light based on the module detecting a nighttime, wherein the module is operative to cause the light emitting diode light bulb and the other light emitting diode light bulbs to communicate together to track the motion by illuminating with the low level of light when the module detects the motion during the nighttime;

wherein certain ones of the plurality of light emitting diodes detect temperature and thermal energy above a predefined threshold in detecting a fire emergency;

wherein in response to the fire emergency, the module is operative to actively search for the motion of a person during the fire emergency by selectively powering off particular light emitting diodes of the plurality of light emitting diodes; and wherein in response to the fire emergency, the module is operative to illuminate the plurality of light emitting diodes that are directed in a field of view toward the motion of the person as a spotlight during the fire emergency, while powering off the other light emitting diode light bulbs that are not in the field of view in order that the person is being viewed by fire personnel during the fire emergency.

12. The apparatus of claim 11, further comprising a battery;

wherein in response to a power outage, the module is operative to detect the motion by utilizing battery power of the battery.

13. The apparatus of claim 11, further comprising a battery;

wherein the module is operative to cause the light emitting diode light bulb to illuminate by utilizing battery power of the battery; and wherein the module is operative to cause the other light emitting diode light bulbs to illuminate by utilizing battery power from respective batteries.

14. The apparatus of claim 11, wherein the module is operative to determine a security emergency, wherein the module is operative to cause the light emitting diode light bulb and the other light emitting diode light bulbs to illuminate in a mode indicative of the security emergency in response to the module detecting the motion in a secure environment; and wherein the module is operative to cause the light emitting diode light bulb and the other light emitting diode light bulbs to illuminate in a mode that dazzles where the motion is detected in response to the module detecting the motion in the secure environment during the security emergency.

15. A system for light management, comprising:

a plurality of light emitting diode light bulbs operative to communicate with one another, the plurality of light emitting diode light bulbs having bases that fit sockets designed for incandescent light bulbs, wherein the plurality of light emitting diode light bulbs are operative for illumination;

a module of the plurality of light emitting diode light bulbs, the module being operative to control the plurality of light emitting diode light bulbs, wherein the module is operative to detect an emergency, wherein the module comprises and integrates hardware of a detection module and controller;

wherein:

the module is operative to cause the plurality of light emitting diode light bulbs to cooperatively illuminate a predefined exit route in response to detecting a fire emergency;

the module is operative to cause the plurality of light emitting diode light bulbs to cooperatively illuminate in a mode indicative of a weather emergency in response to detecting the weather emergency;

the module is operative to cause the plurality of light emitting diode light bulbs to cooperatively illuminate in a mode indicative of a security emergency in response to detecting the security emergency; and the module is operative to detect a residual voltage of an electrical power source when a control for powering the light emitting diode light bulb is powered off, the module detecting the residual voltage when a path to a hot wire is open in the electrical power source;

wherein when the path to the hot wire is open in the electrical power source, the module detects the residual voltage on a closed path with the light emitting diode light bulb that remains closed between a neutral wire and a ground wire, the residual voltage being approximately 7 volts.

16. The system of claim 15, wherein in response to detecting the fire emergency, the module is operative search for motion by utilizing the plurality of light emitting diode light bulbs.

17. The system of claim 16, in response to the module detecting the motion during the search for the motion, the module is operative to cause the plurality of light emitting diode light bulbs to illuminate in a strobe mode in the vicinity where the motion is detected.

18. The system of claim 15, wherein in response to a power outage, the module causes the plurality of light emitting diode light bulbs to illuminate by utilizing battery power from respective batteries.

\* \* \* \* \*